United States Patent
Rozman et al.

(10) Patent No.: US 9,349,145 B2
(45) Date of Patent: May 24, 2016

(54) SYSTEM AND METHOD FOR GATHERING AND PRESENTING CREDIT INFORMATION AND LOAN INFORMATION FOR INDIVIDUALS AND SMALL BUSINESSES

(71) Applicant: BOEFLY, LLC, New York, NY (US)

(72) Inventors: Michael Rozman, Needham, MA (US); Brian O'Boyle, Wellesley, MA (US)

(73) Assignee: Boefly, LLC, New York, NY (US)

( * ) Notice: Subject to any disclaimer, the term of this patent is extended or adjusted under 35 U.S.C. 154(b) by 0 days.

(21) Appl. No.: 14/180,601

(22) Filed: Feb. 14, 2014

(65) Prior Publication Data

US 2015/0235310 A1    Aug. 20, 2015

(51) Int. Cl.
*G06Q 40/00* (2012.01)
*G06Q 40/02* (2012.01)

(52) U.S. Cl.
CPC .................................. *G06Q 40/025* (2013.01)

(58) Field of Classification Search
CPC ....... G06Q 10/00; G06Q 20/00; G06Q 30/00; G06Q 40/00
USPC ...................................................... 705/3–44
See application file for complete search history.

(56) References Cited

U.S. PATENT DOCUMENTS

| | | | |
|---|---|---|---|
| 6,823,319 B1 * | 11/2004 | Lynch .................... | G06Q 20/10 705/38 |
| 7,356,503 B1 | 4/2008 | Johnson et al. | |
| 7,734,522 B2 | 6/2010 | Johnson et al. | |
| 7,742,980 B1 * | 6/2010 | Klein .................... | G06Q 20/10 705/38 |
| 8,510,184 B2 | 8/2013 | Imrev et al. | |
| 8,521,631 B2 * | 8/2013 | Abrahams .............. | G06Q 40/00 705/36 R |
| 8,606,695 B1 | 12/2013 | Arora et al. | |
| 2008/0294547 A1 * | 11/2008 | Zigman .................. | G06Q 10/00 705/38 |
| 2009/0299911 A1 * | 12/2009 | Abrahams .............. | G06Q 40/00 705/36 R |

* cited by examiner

*Primary Examiner* — Frantzy Poinvil
(74) *Attorney, Agent, or Firm* — Trop, Pruner & Hu, P.C.

(57) ABSTRACT

Engines, systems and methods are disclosed for capturing inputs from an existing or prospective small business owner through an Internet-based graphical user interface, gathering small business and consumer credit data from external sources, combining with data sourced from a database of lender preferences specifying particular loan application characteristics and delivering an output of information, educational lessons, loan qualification offers, and a heuristic assessment of funding likelihood.

11 Claims, 14 Drawing Sheets

View Your Business Loan Report

Congratulations! A lender from Boefly has pre-qualified you for a business loan.

[View Pre-qualification Report]

[Contact Boefly] [Download] [Print]

| 250 | SBSS Score | 650 | FICO Score |
|---|---|---|---|
| | View SBSS Report | | View FICO Report |

250  Your SBSS Score                    Date Generated: Nov 3, 2013
                                                                       Report ID: A74520020542

How lenders view your score            Your Score vs. Others
Historically, others with a score of 250 have a           You scored in the 90 Percentile
6% default rate.

0   40   60   75   100   240   300

Metrics like low (green), medium (orange),
high (red) rate to default with arrow indicating
which section low, medium or high the user
represents. Scores from 0-300. Below 140 =                              90 %
red, below 195 = orange, below 250 = yellow,
above = green.

Your score indicates that you are in the Medium    Relative to the pool of loans used to build this
range risk to default on your loan.                credit score, you scored higher than 90% of all
                                                   loans, and most lenders consider this a good
                                                   score. The higher your score, the more favorable
                                                   lenders look upon you as a credit risk.

What is a FICO® SBSS℠ report?

The FICO SBSS score is used by credit decision makers to assess the underlying
repayment risk of the business at the time of application. The Small Business
Administration has been using the FICO SBSS score since 2007 and currently
uses SBSS to evaluate all loan applications under $350,000. FICO scores are
used in over 90% of small business lending origination decisions.

Finance Education: Loan Structure

What are lenders looking for?

Based on your $500,000.00 Project Cost, here are some guidelines on what to
expect.

| Common Figures | | Your Figures | |
|---|---|---|---|
| Loan Product | SBA 7a | Loan Product | SBA 7a |
| Loan Amount | $500,000.00 | Loan Amount | $500,000.00 |
| Equity Injection: | $125,000.00 (25%) | Equity Injection: | $50,000.00 (25%) |
| Credit Score: | 250 | Credit Score: | 250 |
| Rate: | 6 % (Variable) | Rate: | 10 % (Variable) |
| Term: | 25 Years | Term: | 25 Years |
| Collateral: | $500,000.00 | Collateral: | $100,000.00 |

Our Suggestions to You...

1. Equity Injection: It appears you have $50,000 available for an equity injection. Also, because
   you have over $50,000 in retirement assets, you may qualify for a program to access your
   assets tax and penalty free to assist with your equity contribution.

2. An important factor a lender considers in collateral. Lenders will typically seek all available
   collateral on a loan to ensure repayment if a loan defaults. A lender will seek a X % - X % loan

SYSTEM AND METHOD FOR GATHERING AND PRESENTING CREDIT INFORMATION AND LOAN INFORMATION FOR INDIVIDUALS AND SMALL BUSINESSES

BACKGROUND

Small business borrowers historically have had no capacity to directly access information that lenders use to assess an application for business financing. Furthermore small business owners have had no capacity to understand their likelihood of securing financing based on independently secured data. Finally, small business borrowers have had no capacity to access pre-qualification offers based upon matching lender preferences to borrower self-reported and independently secured data.

SUMMARY OF THE INVENTION

Embodiments relate to systems, methods and computer program products for providing prospective business borrowers information as to their likelihood of securing financing, educational content, and pre-qualification offers based at least in part upon independent (non-self-reported) data.

In one aspect, a method includes: receiving, in a security engine of a first computer system of a first entity via a first secure connection, information of a small business concern (which may include financial information of one or more principals of the small business concern and principal identification information); communicating at least some of the small business concern information to one or more external credit sources, via a second secure connection; receiving credit data from the external credit source(s) responsive to the communicating; accessing a database of the first entity using at least some of the credit data to identify a set of one or more lenders with which the small business concern may be compatible, based at least in part on some of the small business concern information and the credit data, the database including a plurality of entries each associated with a lender and including loan preference information for the lender; generating, in a decision engine of the first entity, a report for the small business concern, where the report includes credit scoring information from the external credit source(s), educational content, and at least one of a likelihood of funding and one or more pre-qualification offers; and communicating the report to the small business concern, via the first secure connection.

In another aspect, a system includes: a user data acquisition module to provide a first graphical user interface to an end user to enable the end user to provide information of a small business concern including financial information of one or more principals of the small business concern and principal identification information; a user data storage coupled to the user data acquisition module to store a record associated with the small business concern including the information; a third party interaction module to receive at least some of the information from the record and to communicate at least some of the information to an external credit source and to receive credit data regarding the small business concern from the external credit source; a third party data storage coupled to the third party interaction module, where the third party data storage is to store the credit data in a record of the third party data storage associated with the small business concern, the third party data storage further including an analysis database associating a collection of credit scoring information regarding unaffiliated small business concerns and loan history information for the unaffiliated small business concerns; a lender interaction module to interface with a lender preference data storage using at least some of the information from the record of the user data storage and the record from the third party data storage; the lender preference data storage coupled to the lender interaction module, where the lender preference data storage includes a plurality of entries each associated with a lender and a loan product, each entry providing one or more preferences; a decision engine coupled to the user data storage, the third party data storage, and the lender preference data storage, where the decision engine includes a first logic to determine a loan amount for the small business concern and to determine whether one or more pre-qualification offers are available for the small business concern based at least in part on the loan amount, at least some of the information from the user data storage, at least some of the credit data, and the one or more preferences from one or more entries of the lender preference data storage; and an education content generation module coupled to the user data storage, the third party data storage, and the lender preference data storage, the education content generation module to generate educational information for the end user to educate the end user regarding a loan obtaining process, the educational information including a comparison of at least some of the credit data to the collection of credit scoring information in the analysis database, and where the decision engine includes a second logic to generate a report including the educational information and an indication of availability of one or more pre-qualification offers, and if no pre-qualification offers are available, to provide a likelihood of funding, where the system is to communicate the report to the end user.

In a still further aspect, at least one non-transitory storage medium (which may be any type of non-transitory storage medium) includes instructions: determine, based on information provided by a user associated with a small business concern, an available amount of equity for use in a project; determine an equity percentage of a cost of the project based on the available equity amount and the project cost; determine whether the equity percentage is at least equal to a ceiling threshold, and if so determine a loan amount based on the project cost and a portion of the available equity amount corresponding to the ceiling threshold, and otherwise determine the loan amount based on the project cost and the available equity amount; and if the equity percentage is less than a floor threshold, further determine a loan capacity amount based on a portion of the project cost and the available equity amount, where the loan capacity amount is to be provided to the small business concern to indicate a level of funding less than the determined loan amount.

BRIEF DESCRIPTION OF THE DRAWINGS

FIG. 2A is an example graphical user interface for interacting with a user in accordance with an embodiment.

FIG. 2B is another example graphical user interface for interacting with a user in accordance with an embodiment.

FIG. 3 is an example graphical user interface for interacting with a lender in accordance with an embodiment.

FIG. 4 is a representative graphical user interface for providing at least a portion of a report to a small business concern user in accordance with an embodiment.

DETAILED DESCRIPTION

Embodiments enable a user, e.g., a principal, owner, prospective owner or other interested user associated with a small business concern, to easily and flexibly obtain information regarding borrowing availability with respect to one or more lenders via a third party technique. More specifically, embodiments enable a small business concern to provide certain information to the third party, which may be an entity unaffiliated with both the small business concern and a plurality of third party lenders. Also, this entity may be unaffiliated with one or more credit reporting bureaus or other entities from which information is obtained and used in determining the availability of lending options. As used herein, the entity is referred to as a "credit brokering entity." However, understand this terminology is for purposes of discussion, and an entity need not be an actual broker. Simply put, the entity may be a third party with respect to borrowers and lenders, although embodiments may equally be used by lenders and other loan servicing entities.

Figure 1:
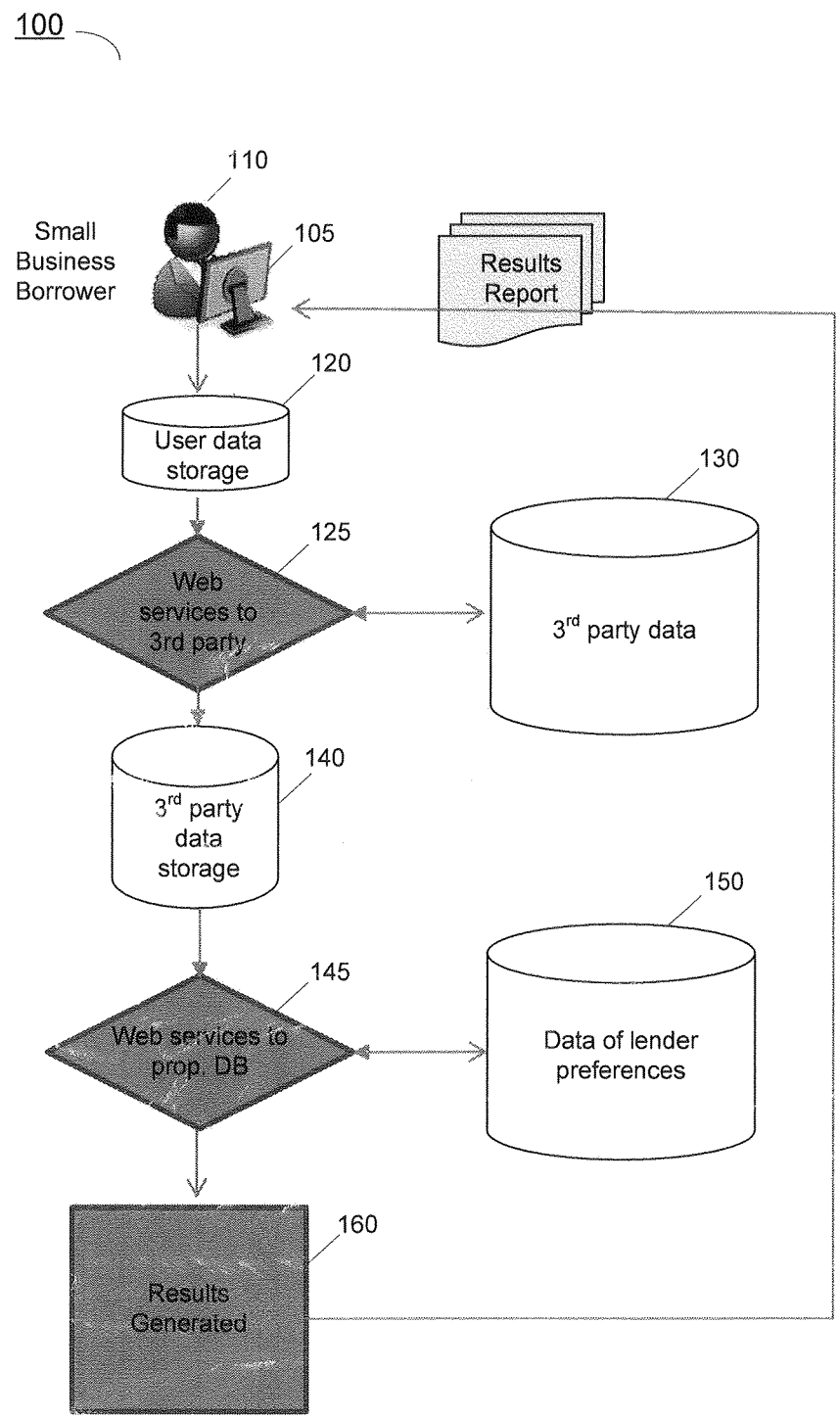
FIG. 1 is a flow diagram of a high level view of a method of operation in accordance with an embodiment of the present invention.

Referring now to FIG. 1, shown is a flow diagram of a high level view of a method of operation in accordance with an embodiment of the present invention. As seen in FIG. 1, a workflow representing a method 100 is illustrated. In the illustration, a small business borrower 110, which may be principal of a small business concern or a prospective small business concern, may input certain information regarding himself, the small business concern and certain financial information via entry into a graphical user interface (GUI) accessible via the Internet. More specifically, the GUI may be provided by a credit brokering entity that interfaces with prospective borrowers and prospective lenders. In an embodiment, information captured includes information about the business owner(s) such as years in business and percentage ownership; information about the business such as industry and location; business financials such as historical earnings; and identifiable information such as social security number and owner's address used to obtain third party data. This information captured may be transitioned through a web-services method into a database record for the user.

As seen, borrower 110 may input information into a computer system 105. In various embodiments, system 105 may be any type of computer system, ranging from a portable electronic device such as a smartphone, tablet computer, PDA, portable laptop computer, to a desktop computer or any other type of device.

To enable data communications to occur securely, system 105 may include a security engine such as a fixed token or other hardware to perform security operations. Furthermore, system 105 may include hardware, software and/or firmware to enable the creation and maintenance of a secure connection with a remote site at which systems of the credit brokering entity reside. This remote site may include a network of server computers and storage systems at a location of the entity. Alternately, the remote site may be one or more cloud-based multi-tenant data centers in which the entity flexibly and dynamically leases computing and storage resources.

With further reference to FIG. 1, user 110 may thus input information and provide it via a secure communication to a user data storage 120 located at the remote site, e.g., of the credit brokering entity. In an embodiment, user data storage 120 may be a non-volatile secure storage of the credit brokering entity, such as a data storage system. In an embodiment, an entry in a secure storage 120 may be created and associated with user 110 and may include various fields each to store different information provided by user 110.

Based at least in part on some of this information, the credit brokering entity may generate a query to one or more third parties for information. More specifically, in an embodiment the credit brokering entity may generate, responsive to the user's request, a request for independent credit information for the user and/or small business concern, e.g., using a Social Security number and/or other information associated with user 110 or the small business concern. As an example, a web services application programming interface (API) request 125 may be used to convey an electronic data transfer of an XML file from the credit brokering entity to one or more third parties. As representative examples, the third parties may include one or more credit reporting bureaus such as Equifax that provide credit bureau data, analytic companies such as FICO that provide scores such as the FICO SBSS score, among potentially others.

Responsive to one or more web services requests, the third party providers may access independent information regarding the user or small business concern, e.g., credit scoring or other data associated with the user and/or small business concern present in one or more databases 130. Note that these databases are thus independently controlled databases of one or more third party providers with which the credit brokering entity has entered business relationships.

In turn, the one or more third parties may provide credit reports, e.g., including credit score information back to the credit brokering entity. In an embodiment, this information may be included in an XML file. As seen, the credit brokering entity may store such information in a third party database 140 which in an embodiment can be a separate storage from data storage 120. Understand that each entry of third party data storage 140 may be associated with a given user/small business concern, which may provide association with a corresponding entry within data storage 120.

Still referring to FIG. 1, next using the information obtained from the one or more third party reports present in third party data storage 140, the credit brokering entity may access a database 150. More specifically, database 150 may be a proprietary database of the credit brokering entity that includes proprietary information regarding lender preferences for a wide variety of lenders. More specifically, as shown in FIG. 1, the credit brokering entity may issue, via a web services API 145, a request to database 150 to obtain information regarding one or more lenders having lender compatibility match preferences related to the borrower characteristics. This secure data from database 150 provides lender compatibility match preferences. In an embodiment, this database includes information that directly articulates one or more borrower characteristics that the lenders seek.

Such characteristics are provided by way of information provided directly by user 110 and stored in storage 120 and/or credit scoring information provided by one or more third parties and present in third party data storage 140. Based on this API request, information may be returned from database 150 and provided to a decision engine, which may execute on another system of the credit brokering entity. More specifically, the engine evaluates the data obtained from database 150 as well as information from third party storage 140 to generate a report 160 that includes the third party data regarding the user/small business concern.

Furthermore, the decision engine may, via heuristic assessment, determine a likelihood of financing for the concern. In addition, in some embodiments additional information may be provided in the report, e.g., via the decision engine or another component of one or more systems of the credit brokering entity. Such additional information may include pre-qualification offers, educational lessons regarding lending, among other such information. Although shown at this high level in the embodiment of FIG. 1, understand the scope of the present invention is not limited in this regard.

Figure 2A:
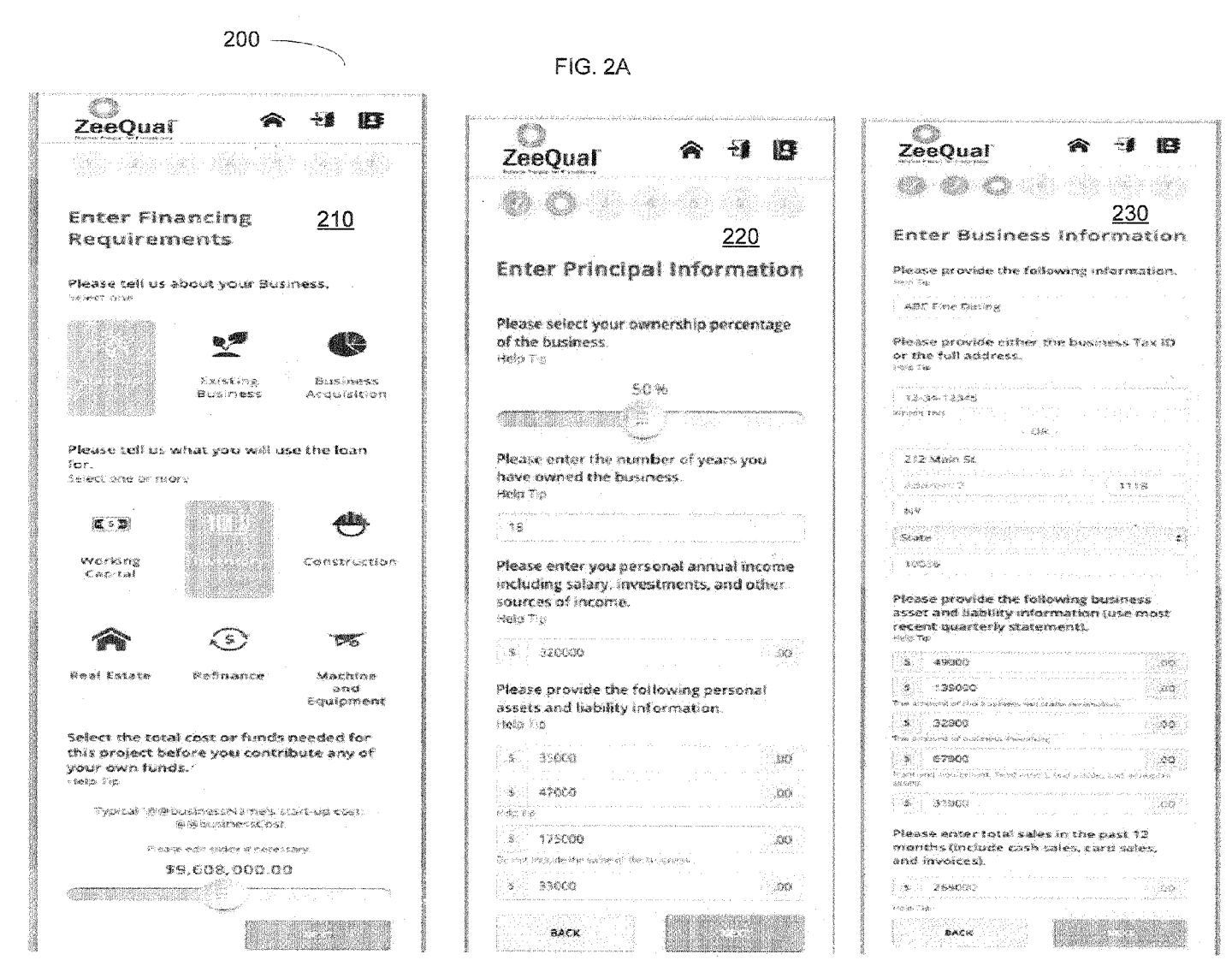
Figure 2B:
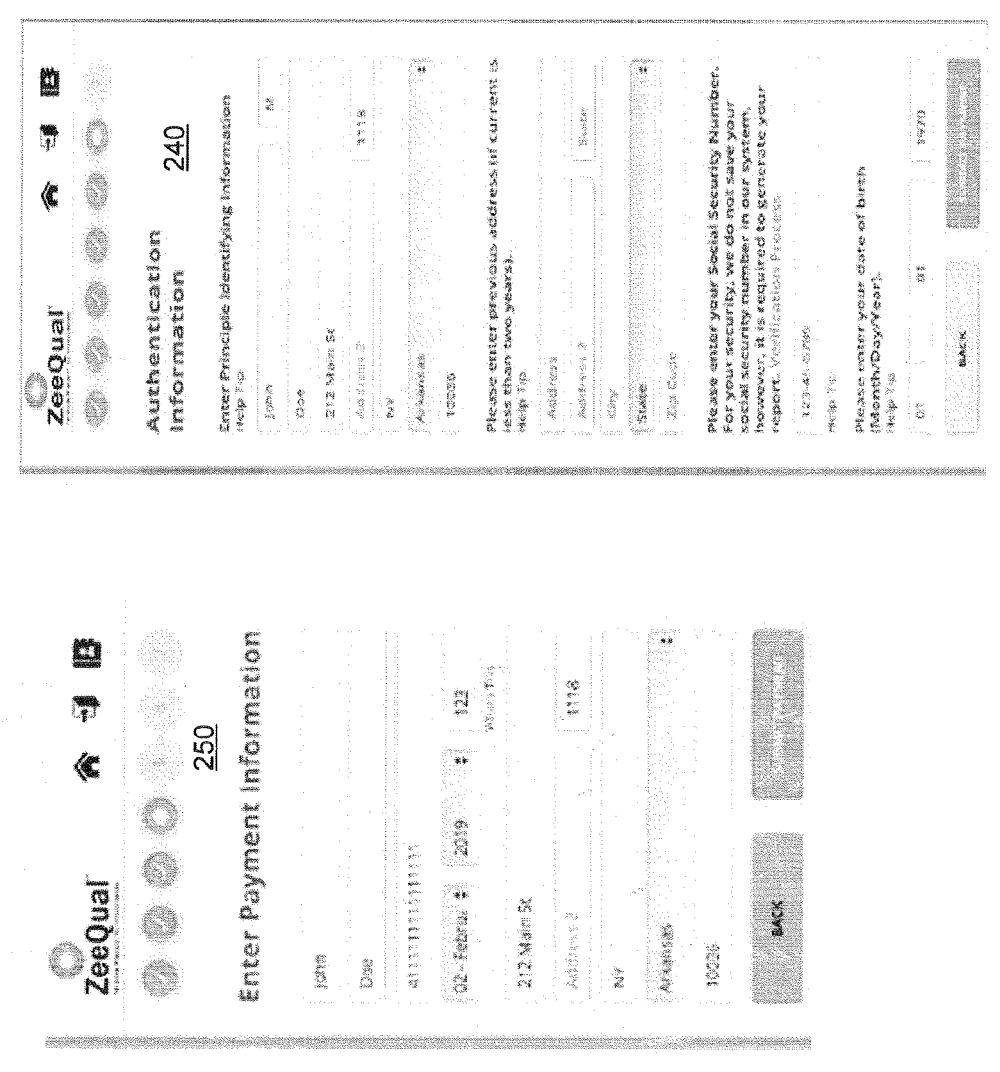

Referring now to FIGS. 2A and 2B, shown is an illustration of portions of a graphical user interface (GUI) 200 for entry of business information, personal information, financial information and so forth by a user of a small business concern. As shown in FIG. 2A, this information may include a first screen 210 to provide details regarding financing requirements and business information such as the type of business (e.g., startup, existing business, or business acquisition). In addition, a user may provide information regarding use of the loan, such as for working capital, inventory, construction, real estate, refinancing, or machine and equipment purchases. Via a second screen 220, a user may further provide personal information of one or more principals, such as ownership percentage, number of years of ownership, personal financial information (e.g., including income, assets, liabilities and so forth). Another screen 230 may provide for entry of business information, including official name, identification information such as a business tax ID, address information, and business information (e.g., asset and liability information).

As further seen in FIG. 2B, via another screen 240 a user can provide authentication information, such as authentication information for the principal, including legal name, address information, Social Security number and so forth. Finally, a payment information screen 250 may provide for receipt of information regarding payment for credit advice services including but not limited to reports generated as described herein.

Figure 3:
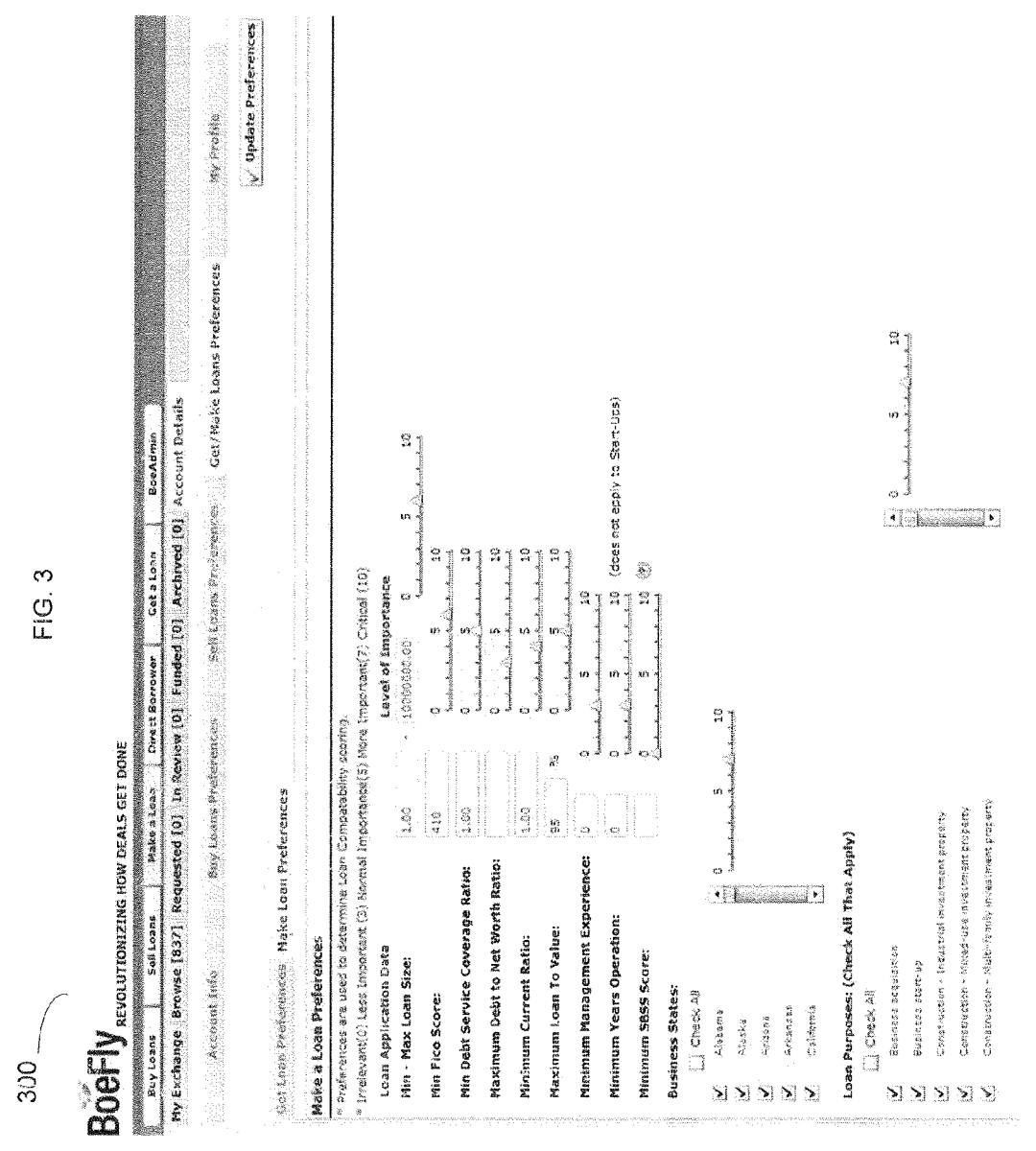

Referring now to FIG. 3, shown is an example of a graphical user interface 300 that the credit brokering entity may provide to lenders to enable each lender to set forth individual lender preferences. From this information, obtained via a GUI such as shown in FIG. 3 or in another manner, the credit brokering entity may create one or more entries in a proprietary database, e.g., database 150 of FIG. 1.

As shown in the example GUI of FIG. 3, a lender may provide a variety of lender preferences characteristics including, for example, loan size, minimum FICO score, minimum debt service coverage ratio, maximum debt to net worth ratio, minimum current ratio, and maximum loan to value. In addition, lender preferences characteristics regarding business history, such as minimum management experience, minimum years of operation, minimum SBSS score, among others may also be obtained. Note for each of the various lender preferences characteristics, a lender may further attach a level of importance, e.g., on a scale between zero and 10. In an embodiment, this level of importance can be used, in part, to provide a compatibility match. For example, if a variable is of limited importance, it may impact a deal-to-lender match score.

Still referring to FIG. 3, additional lender preferences characteristics may be obtained via GUI 300, such as whether the lender is willing to make loans for businesses in particular geographic locations and/or for certain loan purposes. Although shown with particular lender preferences characteristics in the embodiment of FIG. 3, understand that many more, different or alternate characteristics may be present in other embodiments. For example, such lender preferences also may include brand type (e.g., by way of included and excluded brands), minimum equity injection, minimum and/or maximum loan size, location, type of loan use, total annual sales, among other types of criteria. Note that as used herein, the term "lender" is to be construed broadly and encompasses traditional loan product providers, and also encompasses other lead-sourcing entities for which financial pre-qualification is relevant, such as a franchisor. As discussed, the credit brokering entity may generate one or more database entries for each lender with fields corresponding to the various lender preferences characteristics obtained, either via GUI 300 of FIG. 3 or in another manner.

Referring now to FIG. 4, shown is a representative graphical user interface 400 for providing at least a portion of a report to a small business concern user regarding the results of the analysis performed by the credit brokering entity. As discussed above, this report may be generated based on the inputs received from the user, communications with third party credit bureaus or other third party data sources, and analysis of information in one or more databases of the credit brokering entity regarding lender and other information.

An example report includes various information, including an identification of one or more pre-qualification messages that indicate that one or more lenders have pre-qualified the user for some type of product. If no such offers are available for a user, the report may include a likelihood of the user's ability to obtain lender financing. Or both types of information may be shown. In addition, a report may include an indication of one or more credit scores obtained from third party credit bureaus, as well as a discussion of the meaning of such scores. In addition, loan education information may further be provided to enable the user to more fully understand the types of loan products potentially available to the user. While shown with this example GUI in the embodiment of FIG. 4, understand that additional or different information may be provided in other embodiments, and that one or more of the types of information shown may be optional.

Figure 5:
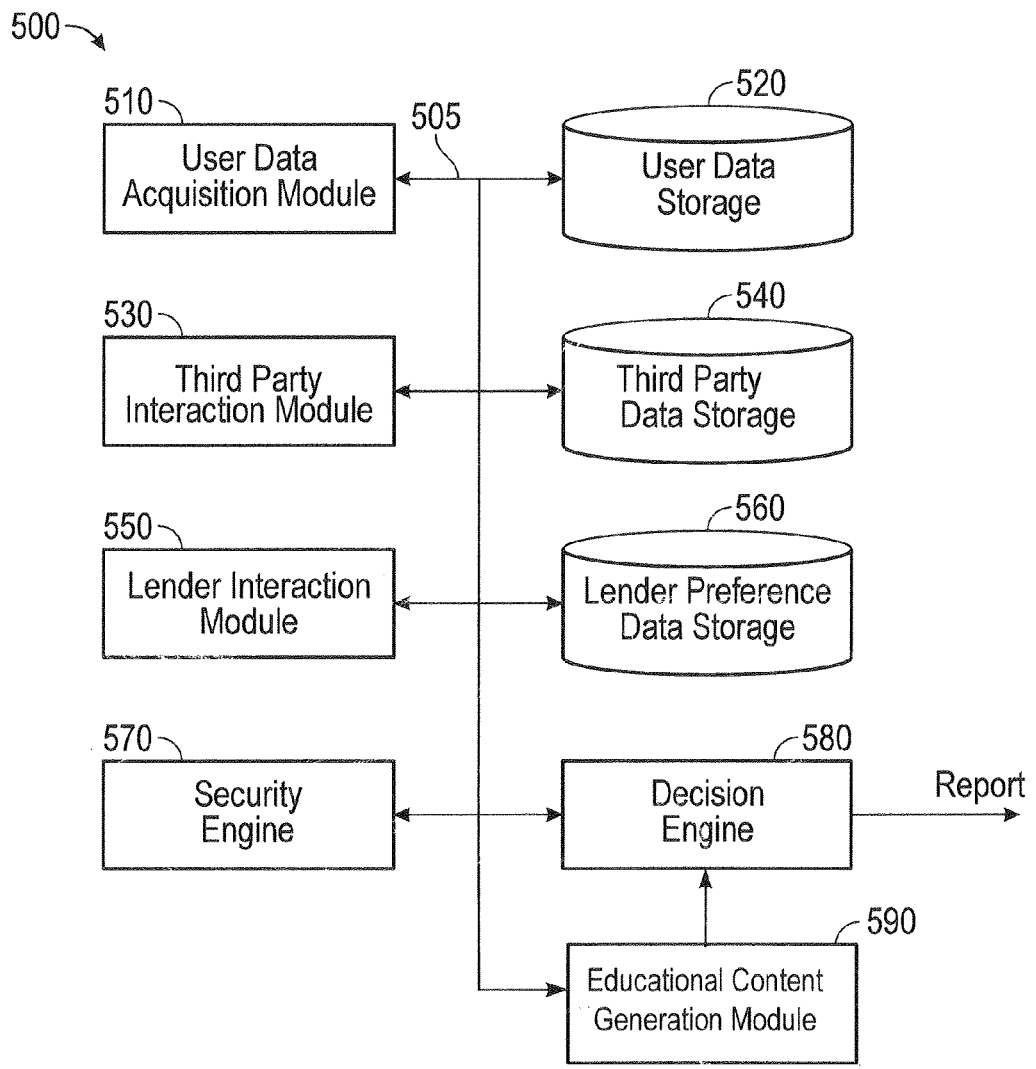
FIG. 5 is a block diagram of a representative system in accordance with an embodiment.

Referring now to FIG. 5, shown is a block diagram of a representative system 500. System 500 may be one or more server computers and/or storage systems associated with the credit brokering entity. As one example, system 500 may be a set of servers and associated storage systems located at a facility of the credit brokering entity. Or a system 500 may be implemented via a network of internetworked systems, e.g., via a cloud-based solution.

In various embodiments, different combinations of hardware, software, and/or firmware may be provided to enable interconnection between different modules of the system to provide for the obtaining of input information, seeking of third party data, and for performing analysis on such information to generate a report to be provided to a potential borrower. In the embodiment shown in FIG. 5, system 500 includes a user data acquisition module 510 that may be configured to interact with a user accessing system 500 via a remote secure system (e.g., via a secure connection such as a virtual private network). User data acquisition logic 510 may be configured to obtain appropriate input information from the user, e.g., via one or more interactive GUIs. Module 510 may store the obtained data in a user data storage 520, e.g., in an entry of the storage associated with the particular user. As seen, an interconnect 505 is present to enable interaction between various modules, engines and storages of system 500.

Based at least in part on some of the information obtained from the user and stored in storage 520, a third party interaction module 530 may perform interaction with one or more third party sources to obtain credit scoring or other credit information associated with the user and/or small business concern, among other applicable third party information. For example, in addition to credit information, additional data such as non-bureau data from the Risk Management Association (RMA) may provide default information regarding certain categories of loans, or FRANdata, or SBA-based information such as a collection of information regarding SBA SBSS approvals and denials (which may be obtained and collected responsive to FOIA requests) also may be considered.

For example, SBA loan historical data obtained from FOIA requests can be analyzed to create database information regarding SBA approval/denial of loan applications based at least in part on SBSS and/or FICO score. Furthermore, other analyses can be performed on the approval/denial data to associate approval/denial likelihood with different criteria including loan amount, lender type, industry type, franchise association and/or other information, all of which can be stored in one or more third party databases. This obtained information may be used both for funding likelihood determinations as well as for providing educational information to an end user. The information obtained may be stored in a third party data storage 540, which in an embodiment may be a separate storage from user data storage 520. Similarly, an entry in this data storage may be associated with the user for the storage of credit bureau information for this user.

Still referring to FIG. 5, using at least some of the information present in both user data storage 520 and third party data storage 540, a lender interaction module 550 accesses a lender preference data storage 560 that stores information regarding certain lender preference characteristics of one or more lenders. As described above, the information populated into lender preference storage 560 may be obtained from various lenders, e.g., each in accordance with the GUI shown in FIG. 3.

A decision engine 580 coupled to various modules and data storages may be configured to generate a report based on information obtained from lender preference data storage 560, third party data storage 540 and user data storage 520. More specifically, business logic or other hardware of decision engine 580 may, based on the various user-provided information, independent verification information (e.g., from one or more third party credit bureaus), and lender preference information, identify one or more lenders that have a loan products for which certain lender preference characteristics have been met.

For example, assume that a first lender has a lender preference characteristic for a minimum FICO score of 700. Also assume that a user has a FICO score greater than this minimum FICO score, and that one or more additional lender preference characteristics of the lender are met by the user's information. In this instance, a product of the lender may be identified as a potential loan product for the user. From all of this information, a report may be generated that indicates one or more pre-qualification offers, loan education information, and additional information. This generated report may be provided to the user.

As further shown in FIG. 5, an educational content generation module 590 is provided. As with the other engines and modules, this module may access information in the various data stores and generate educational information for incorporation into the report (or by way of a separate report). While various types of information may be included in such educational reporting information, in general the education information may illuminate various features of the loan acquisition process. For example, the information may include a discussion of the third party-provided data used to determine likelihood of funding and/or pre-qualification offers, loan product information, and loan term information. For example, the report may associate a given SBSS score and/or FICO score with information regarding how lenders view such scores and/or how the score compares to others small-business concerns. In addition, information regarding reasons for a given score can be set forth. As far as loan product information, details regarding a loan structure, fundability assessment, other possible loan product fits, and other analyses may be provided.

In addition, various educational insights such as the type of industry of the user/small business concern may also be provided, in addition to geographic insights regarding the same. The educational information may further include information regarding ways to improve a chance of funding. Also included may be ancillary considerations such as non-lending elements to consider given a particular business stage (such as outsourced accounting availability), loan process primer information, franchise brand pre-qualification information, among other such information.

As further shown in FIG. 5, a security engine 570 is also present in system 500. Security engine 570, which may be a hardware token in an embodiment, may be used to provide and maintain secure connections with the various parties communicating with system 500, as well as to enforce security protocols within the system so that a user's private and confidential information is not breached by an unauthorized entity. Although shown at this high level in the embodiment of FIG. 5, understand the scope of the present invention is not limited in this regard.

Figure 6:
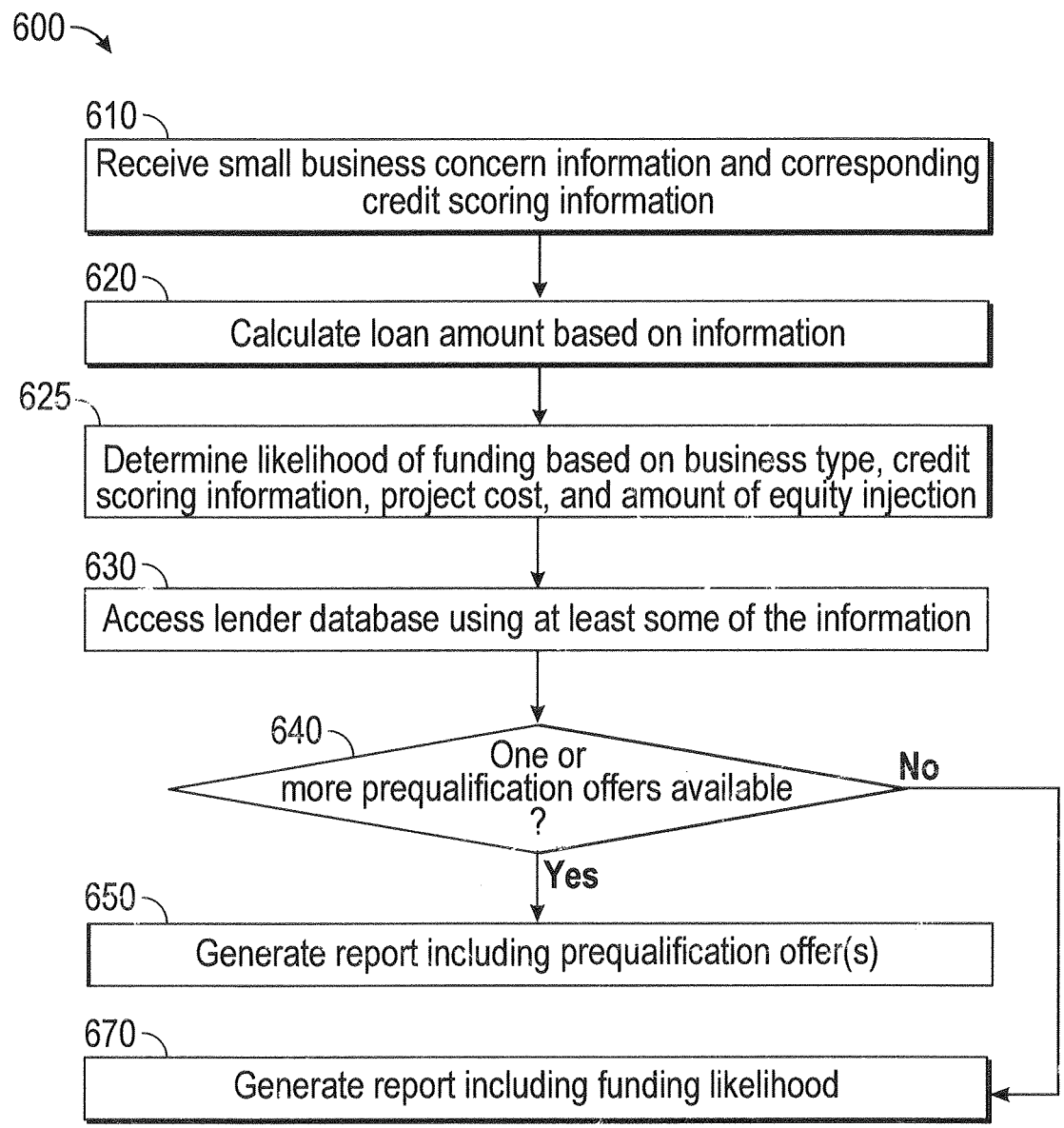
FIG. 6 is a flow diagram of a high level method in accordance with an embodiment of the present invention.

Referring now to FIG. 6, shown is a flow diagram of a high level method in accordance with an embodiment of the present invention. As shown in FIG. 6, method 600 may generally be used to receive information from an end user, obtain additional information from one or more third party credit bureaus regarding the user and/or small business concern, access one or more databases of the credit brokering entity, determine loan availability/likelihood, and generate one or more reports.

As shown in FIG. 6, method 600 begins by receiving information from a small business concern and corresponding credit scoring information (block 610). As discussed above, a user such as a principal of an existing or prospective small business concern may provide personal and business information. Using at least some of this information, the credit brokering entity may obtain credit scoring information from one or more third party credit bureaus.

Using at least some of this information, at block 620 a loan amount may be calculated. Further details regarding calculation of an appropriate loan amount are described below. Suffice to say in some cases a requested loan amount may be the determined loan amount, while in other cases a potentially lower loan amount may be determined.

Next control passes to block 625, where a likelihood of funding may be determined for the individual/small business concern. This determination may be based on various information including, for example, business type, credit scoring information, project cost, and amount of equity injection available. Note that in making this determination of funding likelihood, in at least some cases instead of a determined loan amount, a lesser loan value, referred to as a loan capacity amount, may be used. This loan capacity amount may be lower than a requested loan amount, but is calculated to be a suitable value for a borrower (e.g., more easily to afford and/or more likely to obtain funding).

Still referring to FIG. 6, at block 630 a lender database may be accessed using at least some of the obtained and determined information, and then at diamond 640 it can be determined whether one or more pre-qualification offers are available.

For example, in prior activity each of multiple lenders may establish loan criteria for one or more loan products, which may be communicated to the credit brokering entity, which may generate a database entry or record, e.g., a record (which may include multiple loan criteria) per given loan product per given lender. In an embodiment, the credit brokering entity may provide a GUI to enable a lender to select one or more desired criteria or variables. For whatever variables are selected, all must evaluate to TRUE to enable a pre-qualification offer to be issued for the given lender/loan product. For example, if a lender only cares about loan size, credit score (e.g., one or more), and equity amount, settings may be established accordingly, e.g., at the following levels: $100,000-$300,000; 650, and 20%. And if a borrower matches on these same criteria, a pre-qualification offer may be generated.

Note that a lender may be able to set more than one record. For example, different credit scores and equity injection levels may be provided for different business types and/or loan purposes (e.g., different criteria for a startup vs. a business acquisition). Also understand that in some embodiments, a lender may be able to exclude or include based on specific criteria. For example, a lender may be able to "exclude" specific brands (e.g., when dealing with franchise-type situations) when setting a record and "include" specific brands when setting a record. In an embodiment, the GUI may provide a list of franchises to enable the lender to systematically include or exclude from consideration.

Still with reference to FIG. 6, if a pre-qualification offer is available, control passes to block 650 where a report may be generated including such pre-qualification offers. Of course in addition to providing these pre-qualification offers, additional information is included in the report. For example, credit scoring information obtained from the credit bureaus may be communicated, along with loan education information, among other potential information. This report may then be communicated back to the user.

With reference back to diamond 640 if no pre-qualification offers are available, control instead passes to block 670, where a report may thus be generated including funding likelihood information. Of course in addition to this information other information such as discussed above may be included, e.g., loan education information, credit scoring information and so forth. Although shown with this particular simple implementation in the FIG. 6 embodiment, understand that many variations and alternatives are possible.

In an example, the following Tables 1-4 provide information regarding a funding likelihood matrix that may be used to determine the likelihood based on factors including business type, equity injection availability and credit score. Understand that in other situations, additional and different criteria may be considered.

TABLE 1

Start-Up

| | Fico Score | | Equity Injection | | SBSS Score |
|---|---|---|---|---|---|
| High | f >= 750 | and | e >= 20% | and | sbss >= 164 |
| High | f >= 700 | and | e >= 25% | and | sbss >= 164 |
| High | f >= 650 | and | e >= 30% | and | sbss >= 164 |
| Moderate | f >= 750 | and | e >= 20% | and | sbss >= 140 |
| Moderate | f >= 700 | and | e >= 25% | and | sbss >= 140 |
| Moderate | f >= 650 | and | e >= 30% | and | sbss >= 140 |

TABLE 1-continued

Start-Up

| | Fico Score | | Equity Injection | | SBSS Score |
|---|---|---|---|---|---|
| Moderate | f >= 600 | and | e >= 35% | and | sbss >= 140 |
| Low | everything else | | | | | eg, Equity Injection Is Needed

TABLE 2

Business Acquisition

| | Fico Score | | Equity Injection | | SBSS Score |
|---|---|---|---|---|---|
| High | f >= 750 | and | e >= 20% | and | sbss >= 164 |
| High | f >= 700 | and | e >= 25% | and | sbss >= 164 |
| High | f >= 650 | and | e >= 30% | and | sbss >= 164 |
| Moderate | f >= 750 | and | e >= 20% | and | sbss >= 140 |
| Moderate | f >= 700 | and | e >= 25% | and | sbss >= 140 |
| Moderate | f >= 650 | and | e >= 30% | and | sbss >= 140 |
| Moderate | f >= 600 | and | e >= 35% | and | sbss >= 140 |
| Low | everything else | | | | | eg, Equity Injection Is Needed

TABLE 3

Existing Business - Equity Is Req'd

| | Fico Score | | Equity Injection | | SBSS Score |
|---|---|---|---|---|---|
| High | f >= 750 | and | e >= 15% | and | sbss >= 170 |
| High | f >= 700 | and | e >= 20% | and | sbss >= 170 |
| High | f >= 650 | and | e >= 30% | and | sbss >= 170 |
| Moderate | f >= 750 | and | e >= 20% | and | sbss >= 150 |
| Moderate | f >= 700 | and | e >= 25% | and | sbss >= 150 |
| Moderate | f >= 650 | and | e >= 30% | and | sbss >= 150 |
| Moderate | f >= 600 | and | e >= 35% | and | sbss >= 150 |
| Low | everything else | | | | |

Loan purpose includes (Construction or Real Estate)
eg, equity_injection_needed = true

TABLE 4

Existing Business - No Equity Req'd

| | Fico Score | | SBSS Score |
|---|---|---|---|
| High | f >= 700 | and | sbss >= 170 |
| Moderate | f >= 650 | and | sbss >= 150 |
| * Low | f < 650 | | |
| Low | everything else | | |

Figure 7:
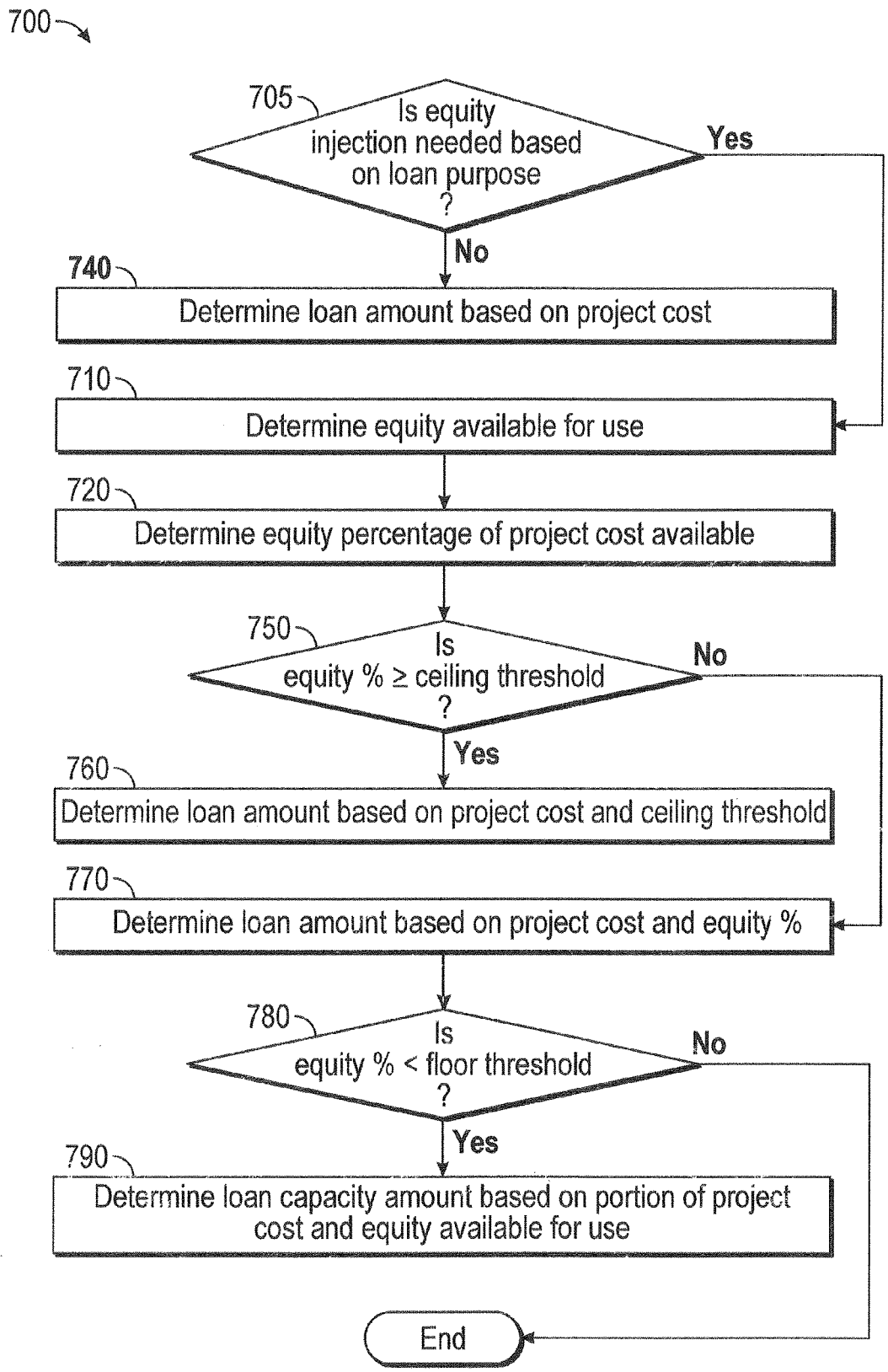
FIG. 7 is a flow diagram of a method for determining a loan amount in accordance with an embodiment.

* Loan Purpose does not include construction or real estate
eg, equity_injection_needed = false Referring now to FIG. 7, shown is a flow diagram of a method for determining a loan amount in accordance with an embodiment. Note that method 700 may be used to determine a loan amount as indicated at block 620 of FIG. 6.

For purposes of discussion, assume that a user is seeking funding for a particular project that has a project cost. For example, the project cost may correspond to an amount required to purchase a franchise, amount to purchase an existing small business, a construction project amount or an amount for any other type of borrowing need.

In general the method may operate as follows. First, a determination is made whether an equity injection is to be included, and if not the loan amount is simply the project cost.

Next, it can be determined whether the user has enough equity to cover a given equity injection percentage (within a range) that is sufficient to obtain a loan value that, with the equity injection, meets the project cost. If this is not the case, next 2 additional operations may be performed. First, a loan/equity combination may be determined to meet the project cost. Second, a loan capacity amount may be determined, which is a lower amount to indicate what a given borrower may be able to afford (and have a likelihood of qualifying for) based on a selected equity injection level (e.g., 20%).

As seen, method 700 begins by determining whether an equity injection is needed based on the loan purpose (diamond 705). That is, in some embodiments in certain types of loan situations, an equity injection is not permitted. For example, in one embodiment for an existing business loan that does not include construction and/or real estate, no equity injection may be permitted, by at least certain lenders. Accordingly in this condition, control passes to block 740 where a loan amount may be determined based solely on the project cost. For example, assume a project is to cost $500,000, the determined loan amount is $500,000.

Otherwise, where an equity injection is needed, an equity amount available for use is determined (block 710). In an embodiment, this available equity may be determined based on information provided by the borrower, including, for example, at least a portion of the borrower's liquid assets, a portion of retirement assets, or other available equity sources of the borrower. Next an equity percentage of a project cost may be determined (block 720). In an embodiment, this determination of a percentage or ratio may simply be the available equity divided by the overall project cost.

From block 720, control passes to diamond 750 to determine whether the equity percentage is greater than or equal to a ceiling threshold. As one example, the ceiling threshold may be 35%. If so, control passes to block 760 where the loan amount is determined based on project cost and this ceiling threshold. That is, an embodiment may limit the amount of equity injection allowed to this ceiling threshold. In the same example of a $500,000 loan and a 35% ceiling threshold, the equity injection thus may be limited to $175,000 and thus the loan amount determined is $325,000.

If instead the equity percentage is less than the ceiling threshold, control passes to block 770 where the loan amount may be determined on the project cost and the equity percentage. For example, assume a 25% available equity injection level and a $500,000 loan. In this case, the determined loan amount may be $375,000 ($500,000-$125,000).

Still referring to FIG. 7, control then passes to diamond 780 to determine whether the equity percentage is lower than a floor threshold. As one example, this floor threshold may be 20%. If the equity injection percentage is lower than the floor amount, control passes to block 790 where a loan capacity amount may be determined. This loan capacity amount is determined to be a lower amount than an actual loan amount that may be requested; however, the loan capacity amount may be determined by the credit brokering entity at a level at which a borrower is more likely to obtain funding (and/or be able to afford) and may be provided to a user as at least a portion of the loan education information to educate the user regarding seeking a loan that is more likely to be available and affordable.

In an embodiment, this loan capacity amount may be determined based on a portion of a project cost and the equity available for use. For example, in an embodiment the project cost portion may be limited to a given percentage of the total project cost, e.g., 40%. Of course understand that while described with this particular example and illustrative scenarios, many alternatives are possible and different lenders may have different requirements that cause the loan amount determination to vary from one lender to another.

In other embodiments, a more basic determination of equity and loan amounts may occur, and then used to determine a fundability assessment. In one example, this determination may be in accordance with the pseudocode of Table 5. As seen in Table 5, a loan amount may be determined with a user-provided equity amount and a user-provided project cost.

TABLE 5

Figure 8A:
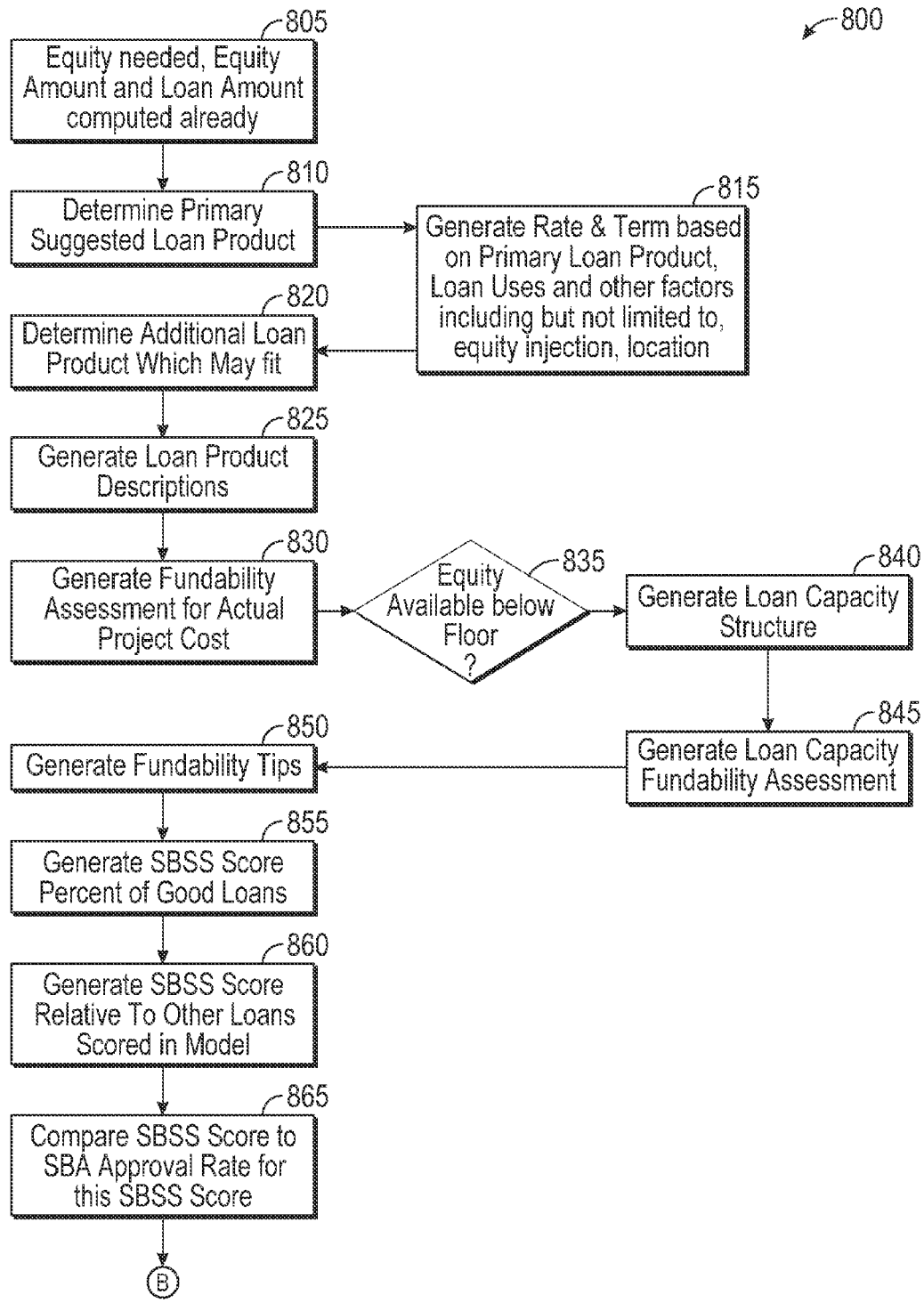
FIGS. 8A-8B are flow diagrams of a method for generating educational content in accordance with an embodiment.
Figure 8B:
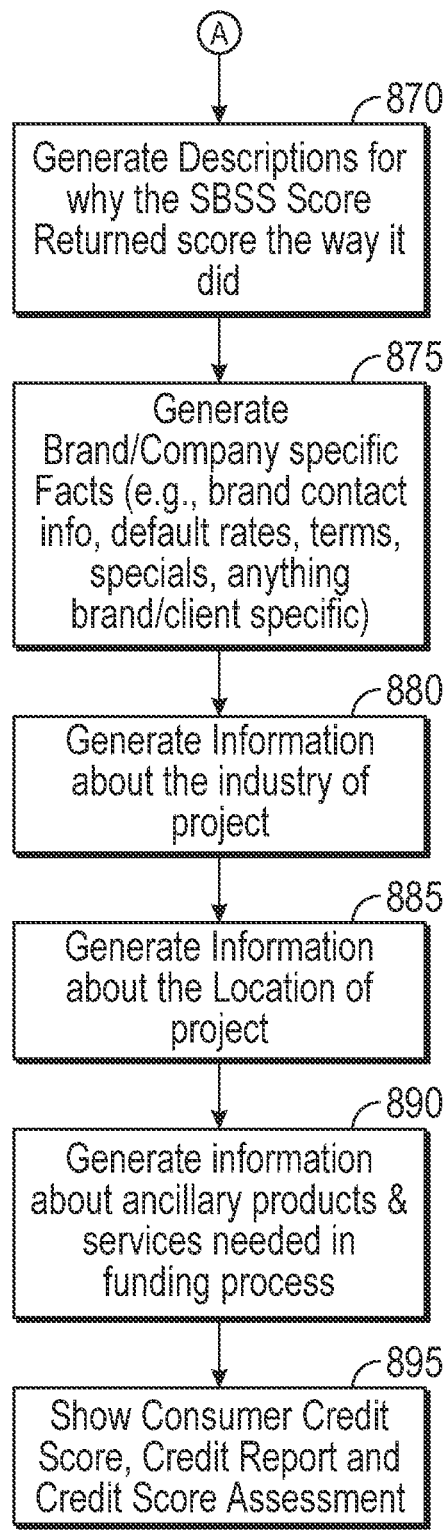

Is Equity Injection Needed?
If NO:
    Loan amount=project cost
If YES:
    Equity injection amount = equity amount supplied by user
    Equity % or project cost = Equity injection amount/project cost
        Loan amount = project cost − equity injection amount As discussed above, educational information may be generated for a given user and provided as part of a report or possibly as a separate report. Referring now to FIGS. 8A-8B, shown are flow diagrams of a method of generating educational content in accordance with an embodiment. Method 800 may be performed by an educational content generation module such as that of FIG. 5. As seen, method 800 begins by determining the amount of equity needed and loan amount (block 805), which may have previously been determined as described above. From this information regarding equity and loan amount, a primary suggested loan product may be determined (block 810). From this product, rate and term information may be generated based on both the product and additional information such as loan uses and other factors such as equity injection, location or so forth (block 815). Next, control passes to block 820 to determine whether additional loan products may be appropriate for the end user. At block 825 descriptions of the loan product (or products) may be generated and at block 830 a fundability assessment may be generated for the actual product project cost. Control next passes to diamond 835 to determine whether equity available is below a floor level. If so, a loan capacity amount may be generated (block 840) such as discussed above. From this information, a loan capacity fundability assessment may be generated at block 840.

Next, from all of this information, fundability tips may be generated at block 850. Next, a SBSS score may be generated to indicate a percentage of good loans for the SBSS score that user obtained (block 855). Next, at block 860 a SBSS score may be generated relative to other loans stored in the model. Then at block 865 this score may be compared to SBA approval rate for the given score. From this, at block 870 descriptions may be generated as to why the given SBSS score was returned.

Control next passes to block 875 where various brand specific facts, e.g., company specific information, contact information, default rates, terms specials or any other information may be provided. At block 880 information about the industry of the project can be generated and at block 885, information about the location of the project may be generated. Then at block 890, information may be generated regarding ancillary products and services needed in the funding process. Finally, at block 895 various amounts of this education information may be provided by way of report to the user, including consumer credit score, credit report and credit score assessment. While shown with this particular detail in the embodiment of FIGS. 8A-8B, understand that variations are possible.

Figure 9A:
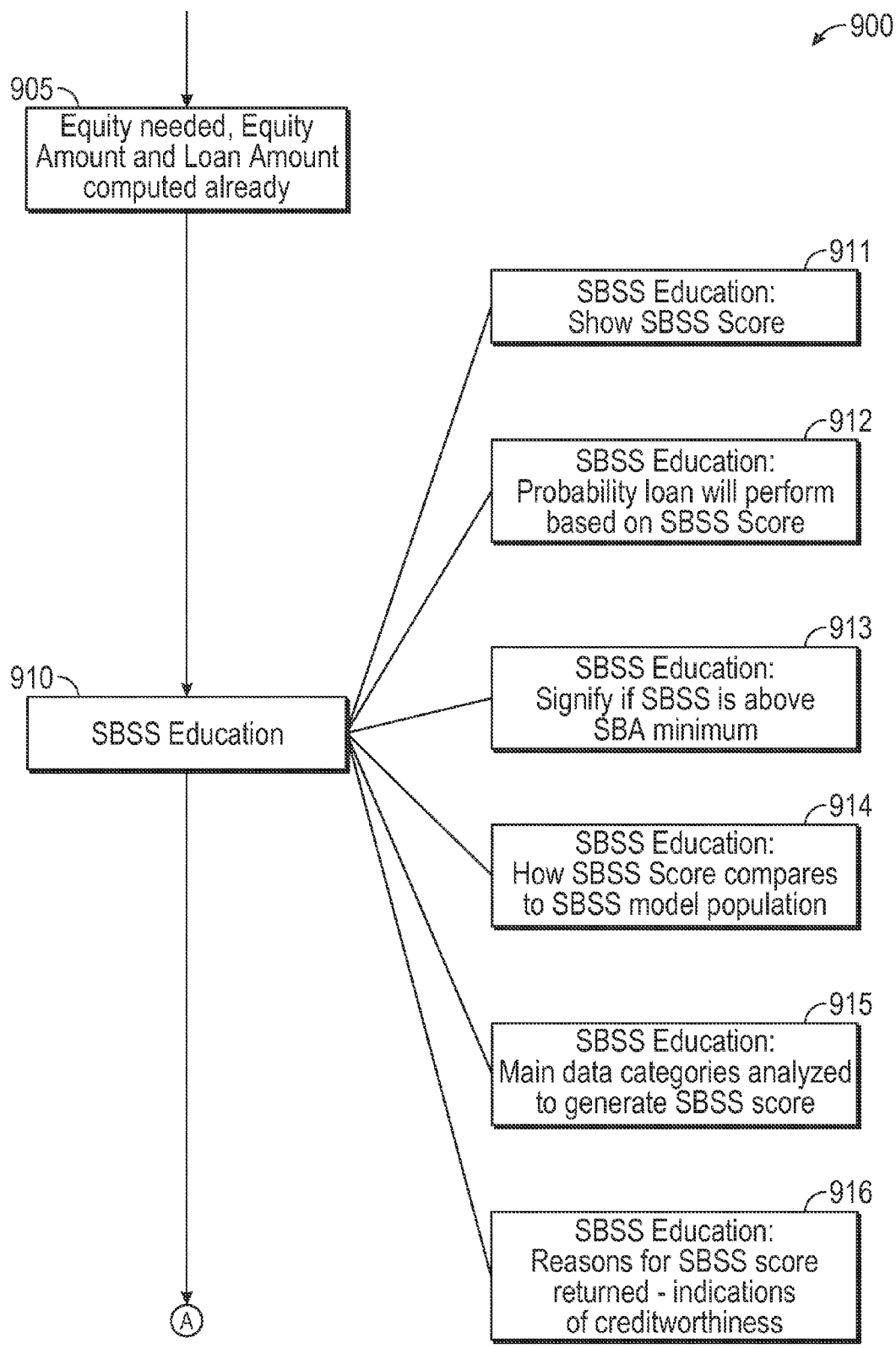
FIGS. 9A-9D are flow diagrams of a method for generating educational content in accordance with another embodiment.
Figure 9B:
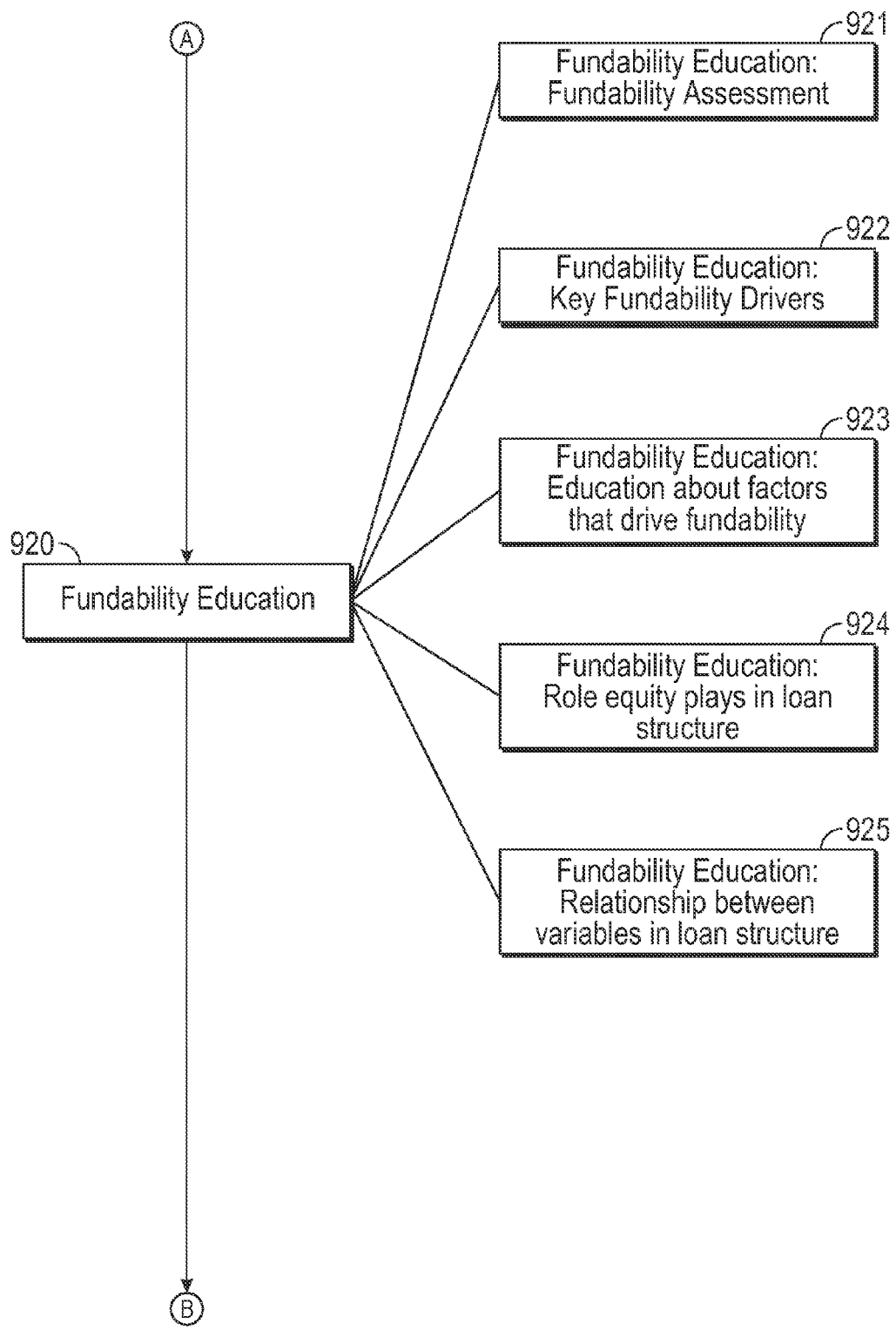
Figure 9C:
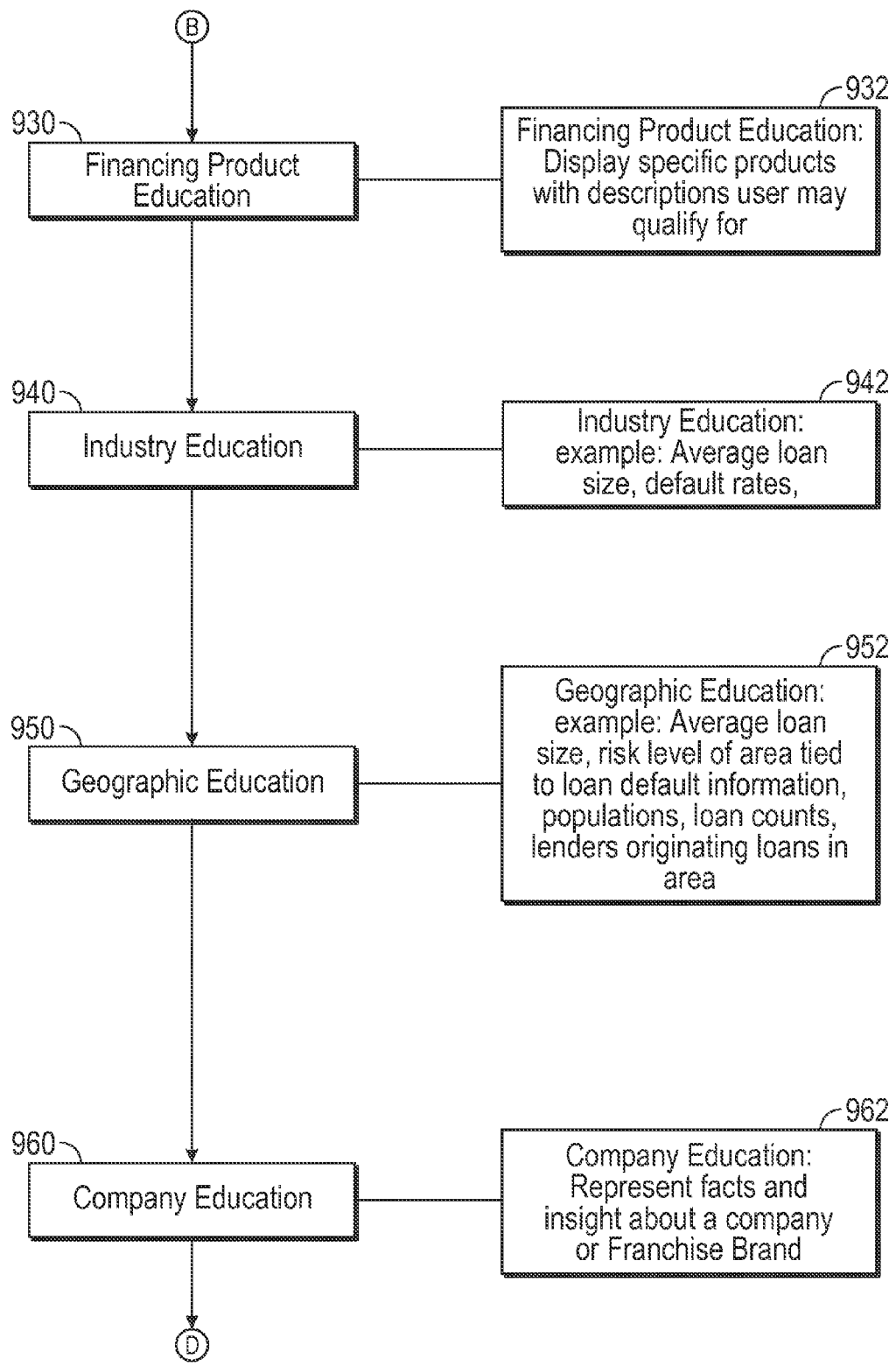
Figure 9D:
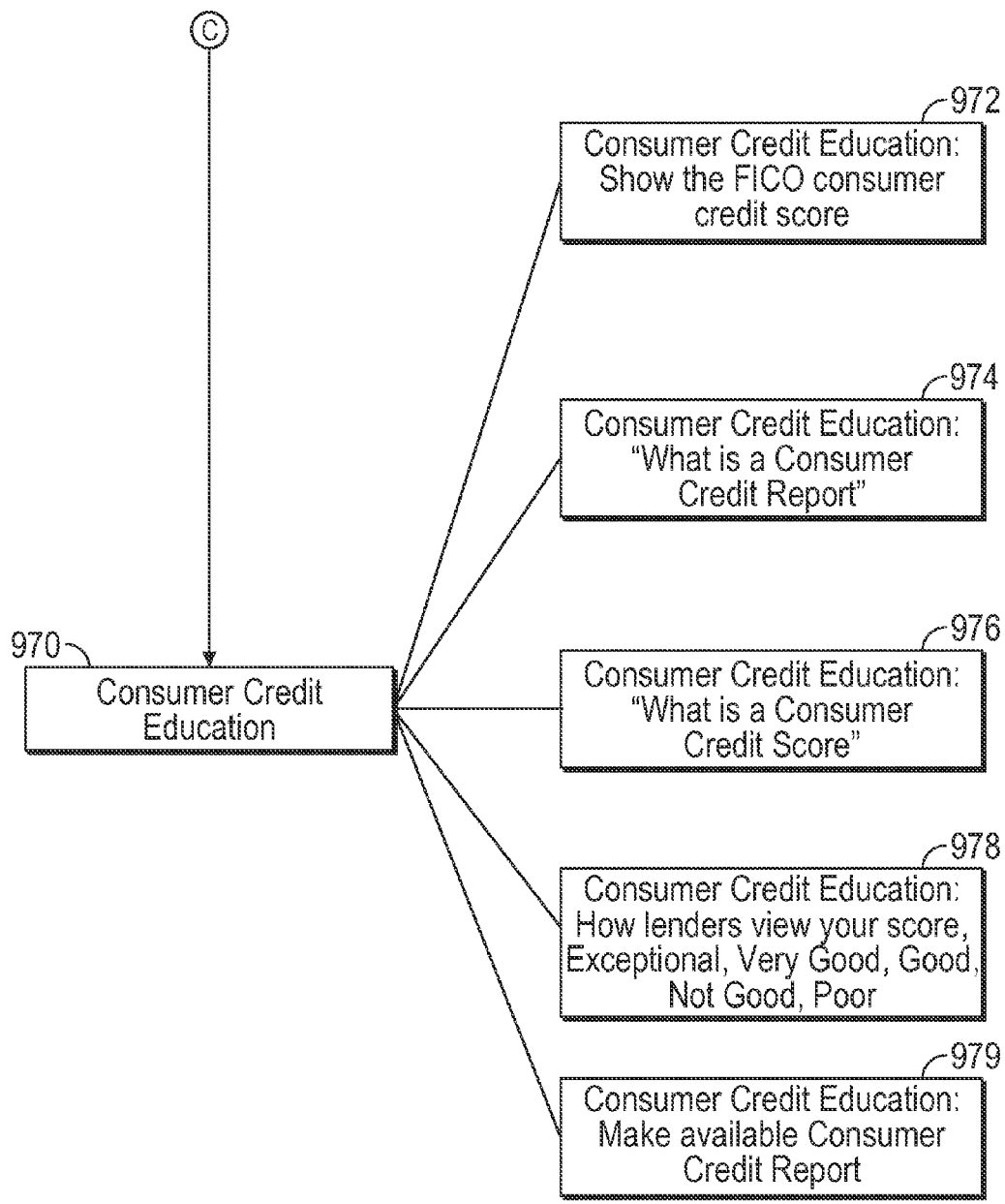

Referring now to FIGS. 9A-9D, shown is a flow diagram of further details of educational content generation in accordance with an embodiment. As shown in FIG. 9A, method 900 begins by determining an equity amount needed (block 905) that may be based on an equity amount and loan amount previously computed as discussed above. Next, SBSS education information may be generated (block 910). In an embodiment, this information may include some or all of an SBSS score, a probability that the loan will be performing based on the SBSS score, an indication as to whether the SBSS score is above a SBA minimum amount, an evaluation as to how the SBSS score compares to an SBSS model population, and an identification of the main data categories analyzed to generate the SBSS score, and reasons for SBSS score value, providing indications of credit worthiness (blocks 911-916).

Next, fundability education information may be generated (block 920). In an embodiment this information may include some or all of: a fundability assessment; fundability drivers; communication of factors that drive fundability; a role that equity plays in a loan structure; and a relationship between variables in loan structure (blocks 921-925).

Next, education information may be generated regarding financing products (block 930). In an embodiment, this information may provide specific products with descriptions about the products for which a user may qualify (block 932). At block 940, industry education may be generated, which in an embodiment may include information regarding average loan size, default rates and so forth (block 942).

At block 950, geographic educational information may be generated. In an embodiment, this information may include average loan size, risk level of the area tied to loan default information, populations, loan counts, lenders originating loans in the area and so forth (block 952).

At block 960, educational information regarding a company may be generated. In an embodiment, this information may include representations of facts and insights about the company and/or franchise brand (block 962).

Finally, in an embodiment consumer credit educational information may be generated (block 970). In an embodiment, such consumer credit education information may include one or more of: a FICO consumer credit score; information regarding what consumer credit reports and scores are; information regarding how lenders view a given score (e.g., as exceptional, very good, good, not good, poor); and making available one or more consumer credit reports (blocks 972-979). Understand that while shown this particular set of educational information in the embodiment of FIGS. 9A-9D, the scope of the present invention is not so limited.

Embodiments may be implemented in code and may be stored on a non-transitory storage medium having stored thereon instructions which can be used to program a system to perform the instructions. The storage medium may include, but is not limited to, any type of non-transitory storage medium suitable for storing electronic instructions.

The present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving, in a security engine of a system including one or more server computers and one or more storage systems of a first entity via a first secure connection, information of a small business concern, the information including financial information of one or more principals of the small business concern and principal identification information, the security engine comprising a hardware fixed token;
   communicating at least some of the small business concern information to at least one external credit source, via a second secure connection;
   receiving credit data from the at least one external credit source responsive to the communicating;
   accessing a database of at least one of the one or more storage systems of the first entity using at least some of the credit data to identify a set of one or more lenders with which the small business concern may be compatible, based at least in part on some of the small business concern information and the credit data, the database including a plurality of entries each associated with a lender and including loan preference information for the lender;
   evaluating, in a hardware decision engine of the system of the first entity, information obtained from the accessed database;
   generating, in the hardware decision engine, based at least in part on the information obtained from the accessed database, a report for the small business concern, the report including credit scoring information from the at least one external credit source, educational content, and at least one of a likelihood of funding and one or more pre-qualification offers, wherein generating the report includes:
      determining a loan amount for the small business concern, including determining an available equity amount and an equity injection ratio based on the available equity amount and a project cost;
      setting an equity injection amount to be less than the available equity amount if the equity injection ratio is greater than a ceiling threshold, and otherwise setting the equity injection amount to the available equity amount;
      if the equity injection ratio is less than a floor threshold, determining a loan capacity amount suitable for the small business concern based on a portion of the project cost and the available equity amount; and
      identifying the one or more pre-qualification offers using the loan amount; and communicating the report to the small business concern, via the first secure connection.

2. The method of claim 1, further comprising calling a first web services application programming interface to communicate the at least some of the small business concern information to the at least one external credit source.

3. The method of claim 2, further comprising calling a second web services application programming interface to access the database of the first entity.

4. The method of claim 1, wherein the first entity comprises a credit brokering entity.

5. The method of claim 1, wherein the educational content includes the loan capacity amount and an indication of loan approval rate for unaffiliated small business borrowers having substantially similar credit scoring information.

6. A system comprising:
   a user data acquisition hardware module to provide a first graphical user interface to an end user to enable the end user to provide information of a small business concern including financial information of one or more principals of the small business concern and principal identification information;

a user data storage coupled to the user data acquisition hardware module to store a record associated with the small business concern including the information;

a third party interaction hardware module to receive at least some of the information from the record of the user data storage and to communicate at least some of the information in the record to at least one external credit source and to receive credit data regarding the small business concern from the at least one external credit source;

a third party data storage coupled to the third party interaction hardware module, wherein the third party data storage is to store the credit data in a record of the third party data storage associated with the small business concern, the third party data storage further including an analysis database associating a collection of credit scoring information regarding unaffiliated small business concerns and loan history information for the unaffiliated small business concerns;

a lender interaction hardware module to interface with a lender preference data storage using at least some of the information from the record of the user data storage and the record from the third party data storage;

the lender preference data storage coupled to the lender interaction hardware module, wherein the lender preference data storage includes a plurality of entries each associated with a lender and a loan product, each entry providing one or more preferences;

a hardware decision engine coupled to the user data storage, the third party data storage, and the lender preference data storage, wherein the hardware decision engine includes a first logic to evaluate information in the user data storage, the third party data storage and the lender preference data storage and determine a loan amount for the small business concern and to determine whether one or more pre-qualification offers are available for the small business concern based at least in part on the loan amount, at least some of the information from the user data storage, at least some of the credit data, and the one or more preferences from one or more entries of the lender preference data storage; and an education content generation hardware module coupled to the user data storage, the third party data storage, and the lender preference data storage, the education content generation hardware module to generate educational information for the end user to educate the end user regarding a loan obtaining process, the educational information including a comparison of at least some of the credit data to the collection of credit scoring information in the analysis database, and wherein the hardware decision engine includes a second logic to generate a report including the educational information and an indication of availability of the one or more pre-qualification offers, and if no pre-qualification offers are available, to provide a likelihood of funding, wherein the system is to communicate the report to the end user.

7. The system of claim 6, wherein the third party interaction module is to call a first web services application programming interface to enable interaction with the at least one credit source.

8. The system of claim 7, wherein the lender interaction module is to call a second web services application programming interface to interact with the lender preference data storage.

9. The system of claim 6, further comprising a security engine to enforce one or more security policies with regard to the small business concern, the at least one external credit source, and one or more lenders having information present in the lender preference data storage.

10. The system of claim 9, wherein the system comprises at least one server computer system and at least one data storage system coupled to the at least one server computer system.

11. A non-transitory storage medium including instructions that when executed enable one or more server computers to perform a method comprising:

receiving, in a security engine of a system including the one or more server computers and one or more storage systems of a first entity, via a first secure connection, information of a small business concern, the information including financial information of one or more principals of the small business concern and principal identification information, the security engine comprising a hardware fixed token;

communicating at least some of the small business concern information to at least one external credit source, via a second secure connection;

receiving credit data from the at least one external credit source responsive to the communicating;

accessing a database of at least one of the one or more storage systems of the first entity using at least some of the credit data to identify a set of one or more lenders with which the small business concern may be compatible, based at least in part on some of the small business concern information and the credit data, the database including a plurality of entries each associated with a lender and including loan preference information for the lender;

evaluating, in a hardware decision engine of the system of the first entity, information obtained from the accessed database;

generating, in the hardware decision engine, based at least in part on the information obtained from the accessed database, a report for the small business concern, the report including credit scoring information from the at least one external credit source, educational content, and at least one of a likelihood of funding and one or more pre-qualification offers, wherein generating the report includes:

determining a loan amount for the small business concern, including determining an available equity amount and an equity injection ratio based on the available equity amount and a project cost;

setting an equity injection amount to be less than the available equity amount if the equity injection ratio is greater than a ceiling threshold, and otherwise setting the equity injection amount to the available equity amount;

if the equity injection ratio is less than a floor threshold, determining a loan capacity amount suitable for the small business concern based on a portion of the project cost and the available equity amount; and identifying the one or more pre-qualification offers using the loan amount; and communicating the report to the small business concern, via the first secure connection.

* * * * *